United States Patent

Oyama

Patent Number: 5,088,055
Date of Patent: Feb. 11, 1992

[54] COORDINATE MEASURING APPARATUS HAVING A STYLUS FRICTION COMPENSATING MEANS

[75] Inventor: Hiroshi Oyama, Ooguchi, Japan

[73] Assignee: Kabushiki Kaisha Okuma Tekkosho, Aichi, Japan

[21] Appl. No.: 483,461

[22] Filed: Feb. 22, 1990

[30] Foreign Application Priority Data

Feb. 22, 1989 [JP] Japan .................................. 1-42735

[51] Int. Cl.⁵ ............................................. G01B 21/00
[52] U.S. Cl. ...................................... 364/560; 33/504; 364/474.18; 364/474.35
[58] Field of Search .............. 364/560, 474.18, 474.35, 364/474.37, 571.01; 33/503, 504, 505, 546, 551, 553, 554, 702

[56] References Cited

U.S. PATENT DOCUMENTS

| | | | |
|---|---|---|---|
| 4,636,960 | 1/1987 | McMurtry | 364/474.37 X |
| 4,659,265 | 4/1987 | Kishi et al. | 364/474.35 X |
| 4,939,678 | 7/1990 | Beckwith, Jr. | 33/505 X |
| 4,945,501 | 7/1990 | Bell et al. | 364/560 X |

Primary Examiner—Joseph L. Dixon
Attorney, Agent, or Firm—Wenderoth, Lind & Ponack

[57] ABSTRACT

A digitize control apparatus having a measuring function of the present invention determines a correct contact point between a stylus and a model on the basis of the displacement vector of a stylus obtained by a scanning head and a position vector indicating a machine coordinate value obtained by a position detecting apparatus, and therefore the influence of friction generated between a stylus and a model can be removed, thereby reducing error in the measurements.

6 Claims, 4 Drawing Sheets

COORDINATE MEASURING APPARATUS HAVING A STYLUS FRICTION COMPENSATING MEANS

BACKGROUND OF THE INVENTION

The present invention relates to a digital coordinate measuring apparatus for determining surface coordinate values representing a model shape by scanning a model surface.

In the prior art, in a case where a complex three-dimensional shape is machined, a three-dimensional model thereof is made and machined using a profile milling machine. In recent years, however, machining is performed by a digital coordinate measuring apparatus which moves a scanning head relative to the model in a predetermined scanning plane while a stylus is contacted with the three-dimensional model surface and the magnitude of the displacement of the stylus is kept constant, and which samples coordinate data with respect to the trace of the spherical center of the stylus obtained by the position detecting apparatus. A numerical control (NC) machining apparatus controls the tools according to the sampled coordinate data. Such a digital coordinate measuring apparatus has come to be used for measuring the surface coordinate values of a model by calculating the coordinate value of a contact point between a stylus and the model.

In a conventional digital coordinate measuring apparatus, to determine contact points between a stylus and the model, the following equation (1) is used.

$$\vec{G} = \vec{P} + \vec{\epsilon} - R \cdot \frac{\vec{\epsilon}}{|\vec{\epsilon}|} \qquad (1)$$

where
$\vec{G}$: position vector indicating the contact point between a stylus and a model
$\vec{P}$: position vector indicating a machine coordinate value
$\vec{\epsilon}$: displacement vector of the stylus
R: radius of a spherical stylus The above equation (1) will be explained with reference to FIG. 1. The vector $\vec{\epsilon}$ and the vector $-R \cdot \vec{\epsilon}/|\vec{\epsilon}|$ actually overlap, but for the sake of understanding, they are depicted as being offset slightly in FIG. 1. Vector $\vec{C}$ is a position vector indicating the center of a stylus S, and is expressed by the following equation (2).

$$\vec{C} = \vec{P} + \vec{\epsilon} \qquad (2)$$

On the other hand, the position vector $\vec{G}$ indicating a contact point between a model M and the stylus S is expressed by the following equation (3), where the displacement vector $\vec{\epsilon}$ of the stylus S is assumed to be a vector indicating the normal line direction of the model M.

$$\vec{G} = \vec{C} - R \cdot \frac{\vec{\epsilon}}{|\vec{\epsilon}|} \qquad (3)$$

By eliminating the position vector $\vec{C}$ indicating the center of the stylus S from the above equations (2) and (3), the above equation (1) is derived.

As noted above, the displacement vector $\vec{\epsilon}$ of the stylus S is assumed to be a vector indicating the normal line direction of the model M. Actually, however, the direction of the displacement vector $\vec{\epsilon}$ of the stylus S deviates from the normal line direction of the model M due to friction between the model M and the stylus S. In FIG. 2, for example, it is known that the calculated position vector $\vec{G}$ indicating the contact point between the model M and the stylus S, which is determined from the above equation (1), deviates from the actual position vector $\vec{G}$ indicating the actual contact point between the model M and the stylus S. As a result, a problem arises in that an error occurs in the measurement value.

SUMMARY OF THE INVENTION

The present invention has been devised in light of the above-mentioned circumstances. An object of the present invention is to provide a digital coordinate measuring apparatus for accurately calculating the contact point between the model and a stylus and obtaining error-free surface coordinate values of a model.

According to one aspect of the present invention, for achieving the object described above, there is provided a digital coordinate measuring apparatus which moves a scanning head grasping a stylus relative to a model while the magnitude of the displacement of the stylus is kept constant by contacting the stylus with the model surface and, which samples machine coordinate values obtained by a position detecting apparatus. The digital coordinate measuring apparatus includes:

means for calculating a tangent line vector of the model from the trace of a position vector indicating the center of the stylus, which is obtained by adding the displacement vector of the stylus obtained by the scanning head and the position vector indicating the machine coordinate value;

means for calculating a normal line vector intersecting at right angles to the tangent line vector from the displacement vector and to the tangent line vector; and means for calculating a position vector indicating the contact point between the stylus and the model from the displacement vector, the position vector which indicates the machine coordinate value, the normal line vector, and the radius of the stylus.

These and other objects, features and advantages of the present invention will become clear by the following description of a preferred embodiment of the present invention with reference to the accompanying drawings.

DESCRIPTION OF THE PREFERRED EMBODIMENT

Figure 1:
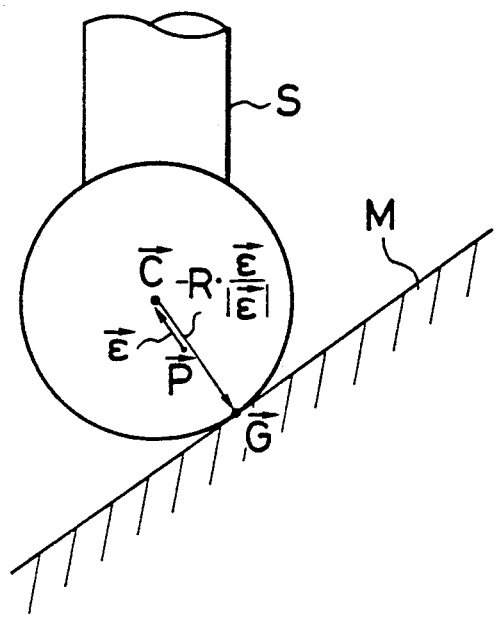
FIGS. 1 and 2 are views for explaining measurements in a conventional digital coordinate measuring apparatus respectively.
Figure 2:
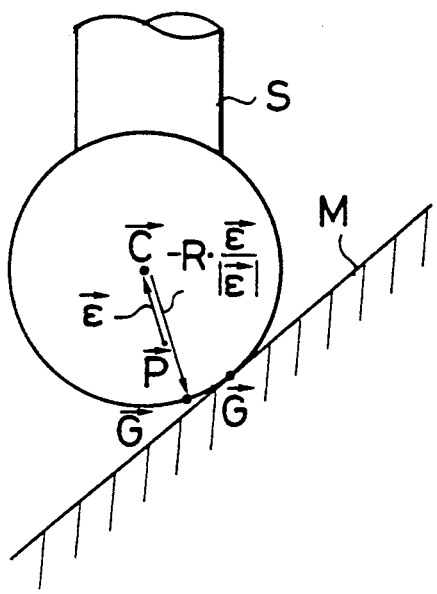
Figure 3:
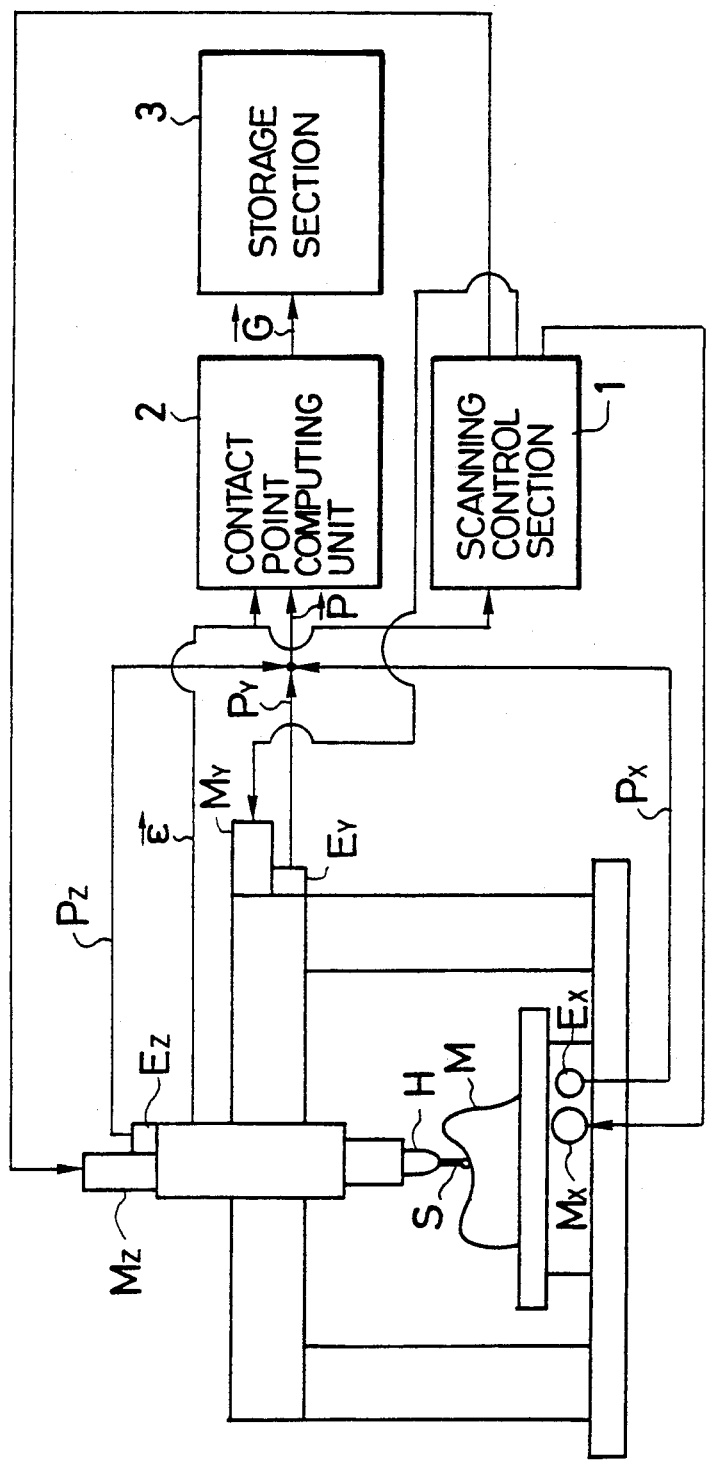
FIG. 3 is a block diagram illustrating one embodiment of a digital coordinate measuring apparatus of the present invention.

FIG. 3 depicts digital coordinate measuring apparatus of the present invention. A scanning control section 1 drives servo motors $M_x$, $M_y$ and $M_z$ to move a stylus S relative to the surface of a model M while maintaining a constant magnitude of the displacement vector $\vec{\epsilon}$ of the stylus S obtained from a scanning head H.

A contact point computing unit 2 determines a position vector $\vec{G}$ indicating the contact point between the model M and the stylus S from the displacement vector $\vec{\epsilon}$ of the stylus S obtained by the scanning head H and the position vector $\vec{P}$ indicating the machine coordinate values $P_x$, $P_y$ and $P_z$ from position detecting apparatus $E_x$, $E_y$ and $E_z$, and stores the position vector $\vec{G}$ in a storage section 3 as a measurement result.

Figure 4:
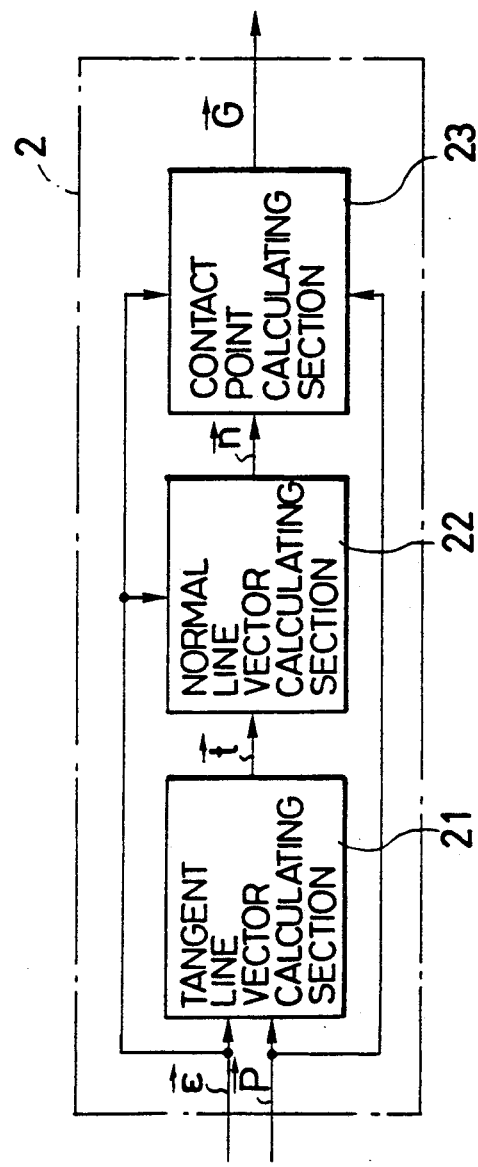
FIG. 4 is a block diagram illustrating one embodiment of the contact point computing unit shown in FIG. 3.
Figure 5:
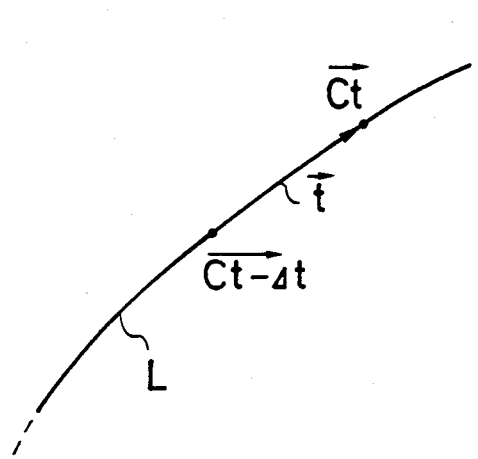
FIG. 5 is a view for explaining the calculation of a tangent line vector.

FIG. 4 is a block diagram illustrating a detailed embodiment of the above-mentioned contact point computing unit 2. A tangent line vector calculating section 21 determines a tangent line vector $\vec{t}$ from the position vector $\vec{C}$ indicating the center of the stylus S, which is the sum of the displacement vector $\vec{\epsilon}$ of the stylus S and the position vector $\vec{P}$ indicating machine coordinate values. That is, as shown in FIG. 5, if the current position vector is denoted by $C_t$ and the position vector $\Delta t$ seconds earlier is denoted by $C_{t-\Delta t}$ in the trace L of the position vector $\vec{C}$ indicating the center of the stylus S, the tangent line vector $\vec{t}$ can be determined by the following equation (4):

$$\vec{t} = \vec{C_t} - \vec{C_{t-\Delta t}} \quad (4)$$

Figure 6:
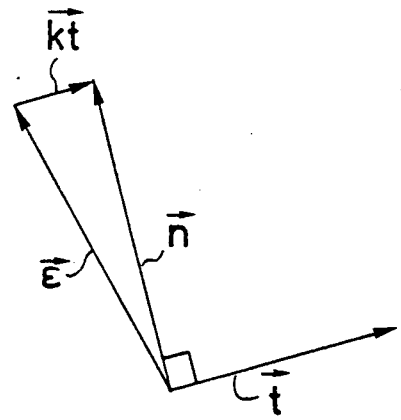
FIG. 6 is a view for explaining the calculation of a normal line vector.

A normal line vector calculating section 22 determines a normal line vector $\vec{n}$ from the displacement vector $\vec{\epsilon}$ of the stylus S and the tangent line vector $\vec{t}$ from the tangent line vector calculating section 21. That is, as shown in FIG. 6, the normal line vector $\vec{n}$ is set as follows:

$$\vec{n} = \vec{\epsilon} + k\vec{t} \quad (5)$$

where k: an unknown number

Since the normal line vector $\vec{n}$ and the tangent line vector $\vec{t}$ intersect at right angles to each other, k can be expressed by the following equation (6).

$$k = -\frac{\vec{\epsilon} \cdot \vec{t}}{|\vec{t}|^2} \quad (6)$$

Therefore, the normal line vector $\vec{n}$ can be determined by the following equation (7).

$$\vec{n} = \vec{\epsilon} - \frac{\vec{\epsilon} \cdot \vec{t}}{|\vec{t}|^2} \cdot \vec{t} \quad (7)$$

Generally, it may be said that since a displacement due to friction occurs in the same direction as the movement direction of a stylus, namely, in a tangent line, the normal line vector $\vec{n}$ indicates a displacement vector in which the influence of friction is removed.

Figure 7:
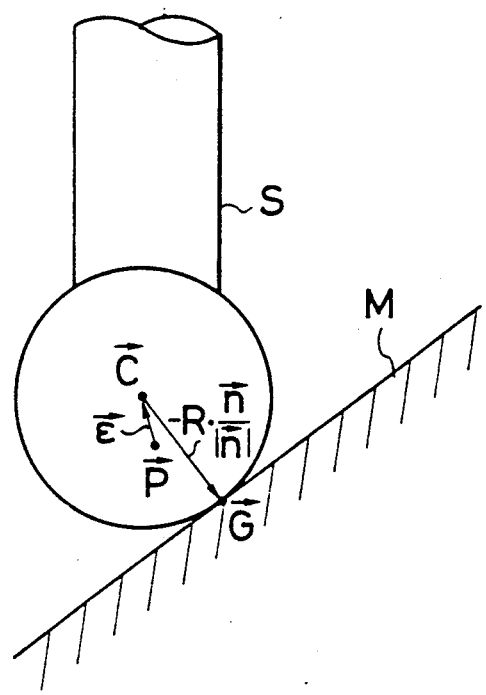
FIG. 7 is a view for explaining the calculation of a contact point.

A contact point calculating section 23 calculates a position vector $\vec{G}$ indicating the contact point between the stylus S and the model M from the displacement vector $\vec{\epsilon}$ of the stylus S, the position vector $\vec{P}$ indicating a machine coordinate value, the radius R of the stylus S, and the normal line vector $\vec{n}$ from the normal line vector calculating section 22. That is, as shown in FIG. 7, since the position vector $\vec{C}$ indicating the center of the stylus S is expressed by equation (2) from the displacement vector $\vec{\epsilon}$ of the stylus S and the position vector $\vec{P}$ indicating the machine coordinate value, the position vector $\vec{G}$ indicating the contact point between the stylus S and the model M can be determined by the following equation (8).

$$\begin{aligned} \vec{G} &= \vec{C} - R \cdot \frac{\vec{n}}{|\vec{n}|} \\ &= \vec{P} + \vec{\epsilon} - R \cdot \frac{\vec{n}}{|\vec{n}|} \end{aligned} \quad (8)$$

In the above-mentioned embodiment, the tangent line vector $\vec{t}$ is determined from the position vector $C_t$ indicating the current center of the stylus and the position vector $C_{t-\Delta t}$ indicating the center of the stylus $\Delta t$ seconds earlier (equation (4)). However, the tangent line vector $\vec{t}$ may also be determined by the following equation (9) from the position vector $C_{d=\Delta d}$ indicating the center of the stylus a fixed distance $\Delta d$ apart from the position vector $C_t$, which indicates the current center of the stylus.

$$\vec{t} = \vec{C_t} - C_{d=\Delta d} \quad (9)$$

As set forth hereinabove, according to the digital coordinate measuring apparatus of the present invention, highly accurate measurement values can be obtained without being influenced by friction between a model and a stylus. Therefore, if the present invention is employed, for example, for checking the dimensions of a product, the reliability of the product can be considerably improved.

Since many apparently widely different embodiments of the present invention can be made without departing from the spirit and scope thereof, it is to be understood that this invention is not limited to the specific embodiments thereof except as defined in the appended claims.

What is claimed is:

1. A coordinate measurement apparatus for determining contact points between a stylus and a model, said coordinate measurement apparatus comprising:

conveying means for conveying the stylus relative to a surface of the model while maintaining a constant magnitude of a displacement of the stylus;

scanning head means for detecting the displacement of the stylus;

position detecting means for detecting a relative position of the stylus;

tangent line vector calculating means for calculating a tangent line vector of the model which is tangent a trace of a first position vector indicating a center of the stylus, the first position vector corresponding to a sum of a displacement vector denoting the displacement of the stylus obtained by said scanning head means and a second position vector denoting the relative position of the stylus obtained by said position detecting means;

normal line vector calculating means for calculating a normal line vector which intersects normal to the tangent line vector at a magnitude in accordance with the displacement vector; and means for calculating a third position vector denoting a contact point between the stylus and the model based on the displacement vector, the second position vector, the normal line vector and a radius of the stylus.

2. In an apparatus a claimed in claim 1, wherein said normal line vector calculating means determines said normal line vector based on a sum of said displacement vector and a vector obtained by multiplying said tangent line vector by a numeric value.

3. In an apparatus as claimed in claim 2, wherein said normal line vector calculating means determines the numeric value in accordance with the following equation, $$k = -\frac{\vec{\epsilon} \cdot \vec{t}}{|\vec{t}|^2}$$

where, k is the numeric value, $\epsilon$ is the displacement vector, $\vec{t}$ is the tangent line vector.

4. An apparatus as claimed in claim 1, wherein said third position vector calculating means calculates said third position vector in accordance with the following equation, $$G = P + \epsilon - R \cdot \frac{\vec{n}}{|\vec{n}|}$$

where, $\vec{G}$ is the third position vector, $\vec{P}$ is the second position vector, $\epsilon$ is the displacement vector, R is the radius of the stylus, and $\vec{n}$ is the normal line vector.

5. An apparatus as claimed in claim 2, wherein said third position vector calculating means calculates said third position vector in accordance with the following equation, $$G = P + \epsilon - R \cdot \frac{\vec{n}}{|\vec{n}|}$$

where, $\vec{G}$ is the third position vector, $\vec{P}$ is the second position vector, $\vec{\epsilon}$ is the displacement vector, R is the radius of the stylus, and $\vec{n}$ is the normal line vector.

6. An apparatus as claimed in claim 3, wherein said third position vector calculating means calculates said third position vector in accordance with the following equation, $$\vec{G} = \vec{P} + \vec{\epsilon} - R \cdot \frac{\vec{n}}{|\vec{n}|}$$

where, $\vec{G}$ is the third position vector, $\vec{P}$ is the second position vector, $\vec{\epsilon}$ is the displacement vector, R is the radius of the stylus, and $\vec{n}$ is the normal line vector.

* * * * *